United States Patent [19]
Andreassen

[11] Patent Number: 5,329,606
[45] Date of Patent: Jul. 12, 1994

[54] FIBER OPTIC CABLE

[75] Inventor: Jon S. Andreassen, Slattum Terasse, Norway

[73] Assignee: Alcatel Kabel Norge AS, Oslo, Norway

[21] Appl. No.: 14,116

[22] Filed: Feb. 5, 1993

[30] Foreign Application Priority Data

Feb. 6, 1992 [NO] Norway .................................. 920484

[51] Int. Cl.⁵ .................................................. G02B 6/44
[52] U.S. Cl. ...................................... 385/109; 385/112; 385/113
[58] Field of Search ................ 385/100, 101, 109, 110, 385/111, 112, 113

[56] References Cited

U.S. PATENT DOCUMENTS

| | | | |
|---|---|---|---|
| 4,645,298 | 2/1987 | Gartside, III | 350/96.23 |
| 4,784,461 | 11/1988 | Abe et al. | 385/112 |
| 4,822,133 | 4/1989 | Peacock | 385/112 |
| 4,946,237 | 8/1990 | Arroyo et al. | 350/96.23 |
| 5,229,851 | 7/1993 | Rahman | 385/112 |

FOREIGN PATENT DOCUMENTS

| | | |
|---|---|---|
| 0256704 | 2/1988 | European Pat. Off. . |
| 0286804 | 10/1988 | European Pat. Off. . |
| 0365762 | 5/1990 | European Pat. Off. . |
| 2541178 | 3/1977 | Fed. Rep. of Germany . |
| 3108381 | 9/1982 | Fed. Rep. of Germany . |
| 2184863 | 7/1987 | United Kingdom . |

Primary Examiner—Rodney B. Bovernick
Assistant Examiner—John Ngo

[57] ABSTRACT

This invention relates to a fiber optic cable construction for optical well monitoring systems, socalled FOWM cables. Such cables have to withstand high temperature, high hydrostatic pressure and an aggressive environment. The fiber optic FOWM cable comprises a first layer of elements stranded around a central core (6;16;24). At least one of said elements is constituted by a tube (4,5;12,13;22,23) within which there is loosely inserted an optical fiber element (2,3;14,15;26,27). The tube (4,5;12,13;22,23) has a diameter which is less than that of the other stranded elements (7;11;21) of the first layer, so as to provide mechanical protection of the tubes and optical fibers.

11 Claims, 2 Drawing Sheets

FIBER OPTIC CABLE

TECHNICAL FIELD

The present invention relates to a fiber optic cable construction for optical well monitoring systems, so-called FOWM cables, having outer diameters in the range up to some 20 mm. Such cables have to withstand high temperatures, (200° C.), high hydrostatic pressures, (1000 bar), and aggressive gas and fluid environments.

BACKGROUND OF THE INVENTION

There are known cables such as an overhead electricity line described in EP No. 286 804, having a steel wire core with a number of steel wires stranded around the core wire and where one of the outer wires is substituted with a steel tubule containing a number of optical fibers. A layer of aluminium wires are stranded around core wires to make up the overhead line. Such a construction is, however, for a number of reasons not suitable for use in oil wells.

SUMMARY OF THE INVENTION

The object of the present invention is to provide a cable which can be produced in lengths of 1,000 m and longer, in one operation, while still satisfying the strong field requirements. The features of the invention are defined in the claims.

The material, dimension and wall thickness of the fiber tubes should be based on the required hydrostatic pressure resistance. The tube should be capable of withstanding a crush resistance of at least 100 kN/m. At this load the diameter decrease should not be more than 1%. The ratio of outer tube diameter to tube wall thickness should correspond to the hydrostatic pressure requirements. The choice of material for the tube should be carefully decided.

The dimension of the central element and the pitch of the stranding process should be based on required strain relief of the optical fibers. The FOWM cables are usually clamped to the sides of an oil/gas production tube. Due to the elevated temperature down in the well, there is, however, need for a fiber excess length so as to prevent the fiber from being stressed continuously. The cable elongation will correspond to the thermal expansion of the production tube. The fiber excess length should at least be equal to the expected thermal expansion of the cable. However, one also has to consider the fiber excess length in view of the tensile performance of the cable.

The possibility of obtaining the fiber excess length within the steel tube itself has been considered, but the stiffness of the fiber and the dimensions are parameters which limit this solution. The preferable design is therefore to wind or strand the tubes containing the fiber around a central element to obtain a loose tube effect. The effect of the loose tube design is analogous to the slotted core principle, but the excess length is obtained by stranding the tubes rather than elongating a slotted cable core when inserting the fibers. From a manufacturing point of view, the standing pitch should be as long as possible. It is, however, preferable that the stranded elements have a lay length or pitch of 15 to 35 times the diameter of the central element.

The cable should have a minimum breaking strength of 6 kN, assuming a maximum working load is 4 kN. Due to the elevated temperature range and the uncertainty in the high temperature effect on the fatigue rate of the fiber, its maximum elongation should be minimized. In order to achieve the required breaking strength and the favorable fiber elongation, the cable should be provided a sufficient number of strength members. Care should, however, be taken to avoid undesirable strain from outer layers on the fiber tubes.

To complete the cable construction, the cable core described, containing a first layer of strength members, such as steel wires, and steel tubes, should be covered with an outer sheath of temperature and aggressive environment resistant material. At least one of the strength members of the first layer of elements, can be made of FRP (Fiber Reinforced Plastic). The diameter of the tube should preferably be 10 to 30% less than that of said other stranded elements in the first layer.

BRIEF DESCRIPTION OF THE DRAWINGS

The above mentioned and other features and objects of the present invention will clearly appear from the following detailed description of embodiments of the invention taken in conjunction with the drawings, where.

BEST MODE FOR CARRYING OUT THE INVENTION

Figure 1:
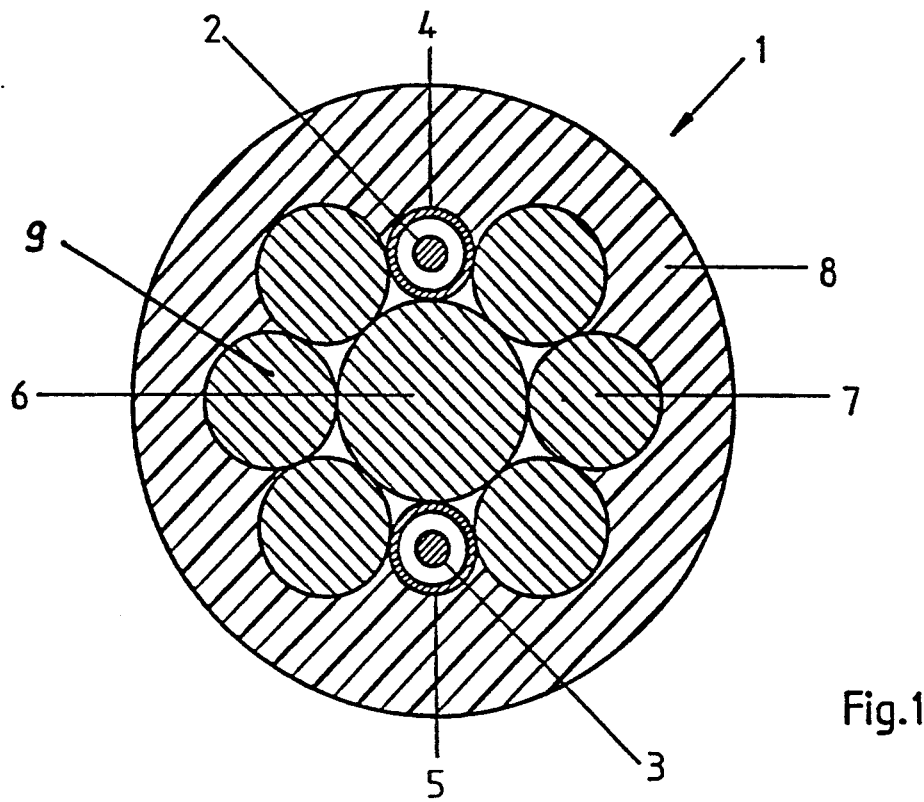
FIGS. 1-3 illustrate three cross sectional views of alternative cable designs.

In FIG. 1 is shown a cable 1 having two optical fibers 2 and 3 located within laser welded tubes 4 and 5. The tubes are helically wound or stranded around a center element 6. Strength members 7 are stranded in a similar way around the center element 6 to ensure sufficient mechanical protection of the tubes 4 and 5. The number of elements 7 is dependent on the space available,—their diameter should however be somewhat larger than the diameter of the tubes. The cable core is surrounded by a polymer sheath 8.

The dimension and wall thickness of the tubes 4 and 5 are based on the required hydrostatic pressure resistance. The dimension of the central element and the pitch for the stranding process is based on required strain relief of the optical fibers. Also, buckling of the optical fibers, causing attenuation increase and stresses within the fiber material, due to the vertical installation have to be avoided. Finally, necessary mechanical strength has to be ensured, provided by sufficient cross-sectional area of the strength members.

In the example shown, the diameter of the center element 6 was 3.2 mm, the diameter of the strength members 7 was 2.0 mm, and the outer diameter of the tubes 4 and 5 was 1.6 mm. The stranding pitch was 90 mm. The coating of the fiber was a temperature resistant polymer material, such as perfluoralcoxy (PFA), Polyetheretherketone (PEEK) and polytherimide (ULTEM). Due to the aggressive environment, the metallic materials have to be corrosion resistant. Both the central element, the strength elements and the laser welded tubes were made of corrosion resistant steel alloys, such as Alloy 825 (DIN NiCr21Mo), Alloy 625 (DIN NiCr2-2Mo9Nb) or Alloy 59 (DIN NiCr23Mo16Al).

The outer polymer sheath 8 was also extruded from a temperature resistant material such as PFA, PEEK or ULTEM.

The described cable construction represents a reliable construction which can be used for extreme aggressive environments and is very suitable in giving improved reliability for monitoring oil/gas well activity.

The first layer may be stranded in one operation, but it will also be possible to make a preliminary strand consisting of the central element 6 and the elements 7, so that the fiber tubes 4 and 5 could be introduced into the strand in a second step. This cable core can be provided with a surrounding tape. The tubes are usually filled with a compound.

Figure 2:
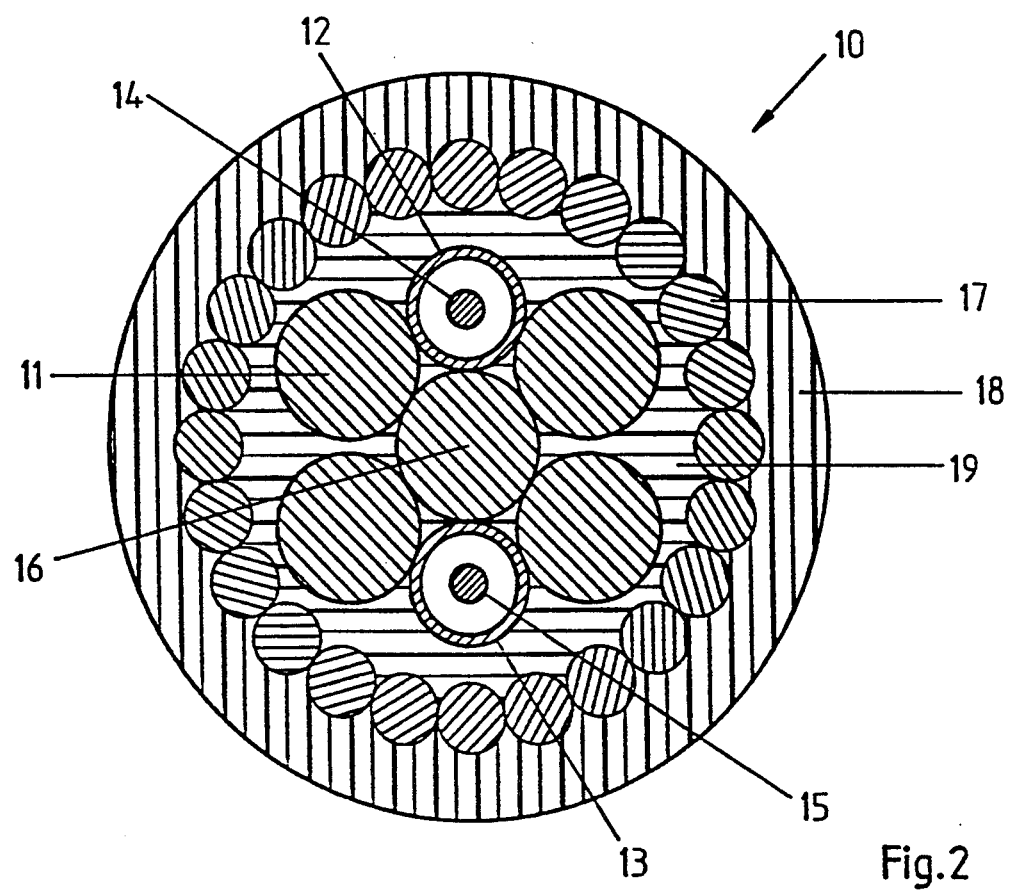

In FIG. 2 is shown an alternative and similar cable construction 10 having a central element 16, two fiber optic tubes 12 and 13, each having an optical fiber 14 and 15, stranded around the central element. In this alternative the diameter of the central element is the same as (or less than) the diameter of four strength members 11 which are also stranded around the center element. The diameter of the tubes 12 and 13 is, however, smaller than the diameter of the strength elements 11. For additional tensile and crush resistance of the fiber tubes, there is arranged an additional layer of strength elements 17 around the core. The diameter of these strength members are chosen on basis of requirements. Alternatively these strength elements can be metal tapes, flat wires or, keystone wires. Measures should preferably be taken to avoid direct contact between these strength elements and the fiber tubes. A polymeric buffer layer 19 may be introduced as shown. As in FIG. 1, a polymer sheath 18 is pressure extruded around the core construction.

In this alternative cable construction the diameter of the center element 16 and the strength members 11 was 2.4 mm, whereas the diameter of the tubes 12 and 13 was 2.0 mm. The pitch was 95 mm.

The number of fiber tubes can be two as shown, but it is possible to have only one fiber tube within the layer of strength members 7 in FIG. 1 and 16 in FIG. 2. It will also be possible to incorporate three or four fiber tubes in said layer. In FIG. 1, the wire 9 could for instance be replaced with a fiber tube, and so could the middle wire on the opposite side. Whereas the diameter of the tubes are always smaller than the diameter of the fiber elements in the same layer, there should always be at least one strength element on each side of a fiber tube. The diameters of the central core and of said other stranded strength elements of the cable can be chosen relative to the diameter of the tube so that there is side contact between all said stranded elements.

Figure 3:
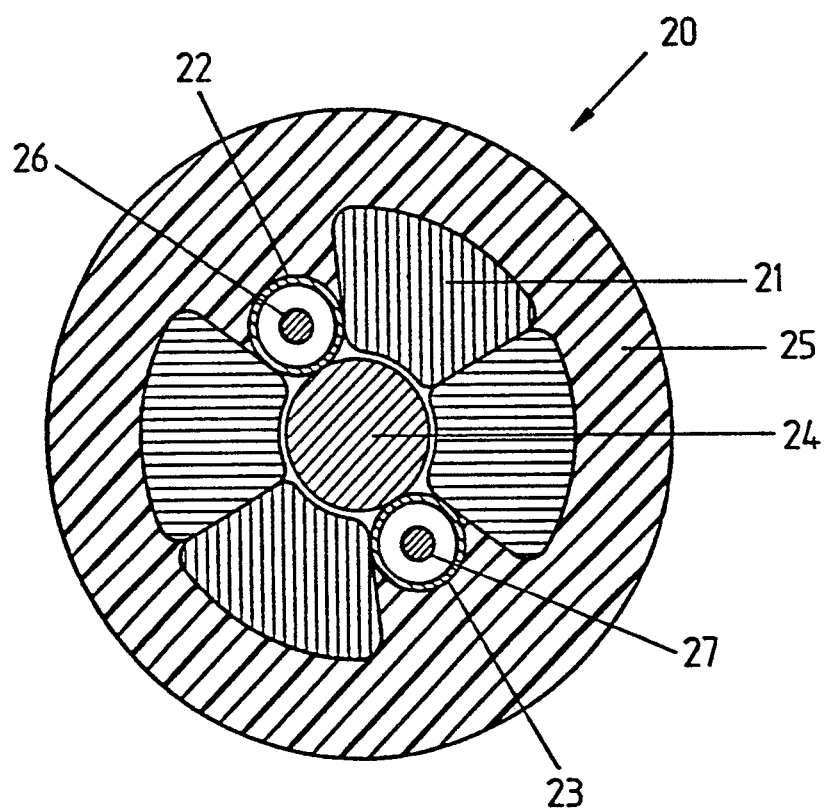

In FIG. 3 is illustrated a cable 20 where a number of keystone profiled wire elements 21 can be used in a stranded layer containing fiber tubes 22 and 23. The metal structure consisting of a central wire element 24, the tubes 22 and 23 and the tensile strength elements 21 is covered with a polymer sheath 25. As illustrated, the profiled elements 21 provide a greater outer diameter than the outer diameter over the optical tubes 22 and 23, in order to mechanically protect the tubes and the fibers 26 and 27 from outer forces. Over the profiled elements there may be provided additional tensile strength layers like that illustrated in FIG. 2.

The outer sheaths, 8 (FIG. 1), 18 (FIG. 2) and 25 (FIG. 3) are shown with a circular cross section. As the cables are to be clamped to a longitudinal structure such as the inside of a production tube, the outer surface of the sheaths could be formed to fit the inner form, such as a rectangular shape, of the clamps (not shown).

I claim:

1. A fiber optic cable having a first layer of elements (4, 5, 7) stranded around a central core (6), including at least one strengthening member (7) and at least one tube (4, 5) having therein an optical fiber element (2, 3) loosely arranged therein, wherein
    said at least one tube (4, 5) has a diameter which is less than that of the strengthening members (7), and the central core (6) has a diameter which is greater than that of said at least one strengthening member (7).

2. A fiber optic cable comprising a first layer of elements (21, 22, 23) stranded around a central core (24), including at least one strengthening member (21) and at least one tube (22, 23) having an optical fiber element (26, 27) loosely arranged therein, wherein
    said at least one tube (22, 23) has a diameter which is less than that of said at least one strengthening member (21), and said at least one strengthening member (21) is shaped like a keystone and has a greater outer diameter than the outer diameter over said at least one tube (22, 23).

3. A fiber optic cable having a first layer of elements (11, 14, 15) stranded around a central core (16), including at least one strengthening member (11) and at least one tube (12, 13) having an optical fiber element (14, 15) loosely arranged therein, wherein
    said at least one tube (12, 13) has a diameter which is less than that of said at least one strengthening member (11), and further includes a second layer of strength elements (17) which is provided over said first layer of elements (11, 14, 15).

4. A fiber optic cable for installation on the inside of an oil/gas production pipe, having a steel core (6; 16; 24) surrounded by a plurality of stranded elements (4, 5, 7; 21, 22, 23) resting on the steel core (6; 16; 24), at least one of the plurality of stranded elements (4, 5, 7; 21, 22, 23) includes a tube (4, 5; 22, 23) having an optical fiber (2, 3; 14, 15; 26, 27) loosely arranged therein, wherein the plurality of stranded elements (4, 5, 7; 21, 22, 23) includes at least one steel strengthening member (7; 11; 21), the tube (4, 5; 12, 13; 22, 23) has a diameter which is less than the diameter of said at least one steel strengthening member (7; 11; 21), said steel core (6; 16; 24) has a diameter which is greater than or equal to the diameter of said at least one steel strengthening member (7; 11; 21), respective diameters of said steel core (6; 16; 24) and said at least one steel strengthening member (7; 11; 21) are chosen so that all of the plurality of stranded elements (4, 5, 7; 11, 12, 13; 21, 22, 23) substantially contact side-by-side each other, and the cable further includes a tight outer sheath (8; 18; 25) which is made of extruded temperature resistant material.

5. A cable according to claim 4, characterized in that the diameter of the tube (4, 5; 12, 13; 22, 23) is 10 to 30% less than the diameter of said at least one steel strengthening member (7; 11; 21).

6. A cable according to claim 5, characterized in that the steel core (6; 16; 24) and said at least one steel strengthening member (7; 11; 21) are all made of steel with a corrosion resistant alloy.

7. A cable according to claim 6, characterized in that the optical fibers (2, 3; 14, 15; 26, 27) are provided with a coating of a temperature resistant polymer.

8. A cable according to claim 4, characterized in that said at least one steel strengthening member (7; 11; 21) have a lay length or pitch of 15 to 35 times the core diameter of the steel core (6; 24).

9. A cable according to claim 4, characterized in that said at least one steel strengthening member (21) have a keystone profiled with a height which is greater than the diameter of the tubes (22, 23).

10. A cable according to claim 4, characterized in that the optical fibers (2, 3; 14, 15; 26, 27) are provided with a coating of a temperature resistant polymer.

11. A cable according to claim 5, characterized in that the optical fibers (2, 3; 14, 15; 26, 27) are provided with a coating of a temperature resistant polymer.

* * * * *